United States Patent
Strobl et al.

(10) Patent No.: US 9,330,721 B2
(45) Date of Patent: May 3, 2016

(54) STREAMING-BASED MEDIA SYSTEM

(71) Applicant: FileCAST Media GmbH, Haag i. OB (DE)

(72) Inventors: Thomas Strobl, Haag i. OB (DE); Alexander Wächter, Moosinning (DE)

(73) Assignee: FileCAST Media GmbH, Haag i. OB (DE)

( * ) Notice: Subject to any disclaimer, the term of this patent is extended or adjusted under 35 U.S.C. 154(b) by 0 days.

(21) Appl. No.: 14/364,679

(22) PCT Filed: Dec. 11, 2012

(86) PCT No.: PCT/EP2012/005112
§ 371 (c)(1),
(2) Date: Jun. 12, 2014

(87) PCT Pub. No.: WO2013/087193
PCT Pub. Date: Jun. 20, 2013

(65) Prior Publication Data
US 2014/0328569 A1  Nov. 6, 2014

(30) Foreign Application Priority Data

Dec. 12, 2011 (DE) .................. 10 2011 120 911

(51) Int. Cl.
*G11B 27/036* (2006.01)
*G11B 27/034* (2006.01)
(Continued)

(52) U.S. Cl.
CPC ............ *G11B 27/036* (2013.01); *G11B 27/034* (2013.01); *G11B 27/06* (2013.01); *G11B 27/34* (2013.01); *H04N 5/91* (2013.01)

(58) Field of Classification Search
CPC combination set(s) only.
See application file for complete search history.

(56) References Cited

U.S. PATENT DOCUMENTS

2002/0146236 A1  10/2002  Kauffman et al.
2006/0156219 A1   7/2006  Haot et al.
(Continued)

FOREIGN PATENT DOCUMENTS

| EP | 1713074 | 10/2006 |
|---|---|---|
| WO | WO 97/39411 | 10/1997 |
| WO | WO 2013/087193 | 6/2013 |

OTHER PUBLICATIONS

International Search Report Dated May 8, 2013 From the European Patent Office Re. PCT/EP2012/005112 and Its Translation Into English.

(Continued)

*Primary Examiner* — Mulugeta Mengesha

(57) ABSTRACT

The invention relates to a system and method for processing or editing media contents. The media system comprises a transcoding apparatus which preferably receives high-resolution media data and converts them into a media stream with low resolution and a media stream with high resolution and provides them with an identical media stream identifier. The images of the media data in the two media streams are provided with identical identification codes by the transcoding apparatus. A logging apparatus receives the media stream with low resolution and displays the media data to a user. The logging apparatus provides the media data as a whole, individual image sequences or images therefrom with metadata. The individual metadata are allocated to individual image sequences or images of the media stream with low resolution using the identification codes and are logically combined with the media data using the media stream identifier.

15 Claims, 2 Drawing Sheets

(51) Int. Cl.
  *G11B 27/34* (2006.01)
  *G11B 27/06* (2006.01)
  *H04N 5/91* (2006.01)

(56) References Cited

U.S. PATENT DOCUMENTS

2008/0273862 A1* 11/2008 Okamoto et al. ............ 386/123
2010/0223649 A1   9/2010 Suitts et al.

OTHER PUBLICATIONS

Search Report [Recherchebericht] Dated Jul. 23, 2012 From the Deutsches Patent-und Markenamt [German Patent and Trademark Office] Re. Application No. 102011120911.9.

David "MCL—Media Component Library. Software-Based Media Conversion: Flexible, Scalable and Future-Proof", David Systems, Product Sheet, Jul. 20, 2012.

* cited by examiner

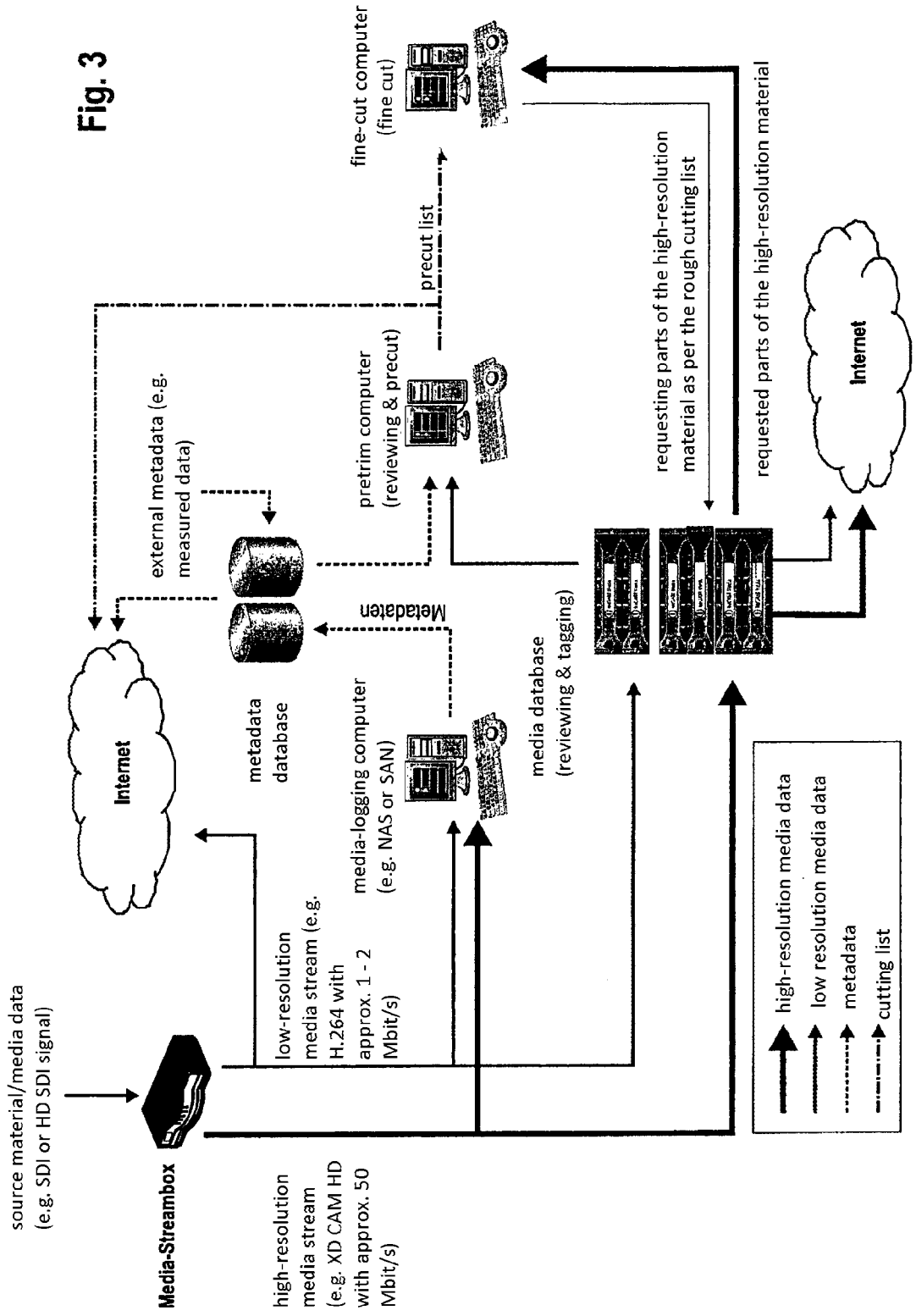

STREAMING-BASED MEDIA SYSTEM

RELATED APPLICATIONS

This application is a National Phase of PCT Patent Application No. PCT/EP2012/005112 having International filing date of Dec. 11, 2012, which claims the benefit of priority of German Patent Application No. 10 2011 120 911.9 filed on Dec. 12, 2011. The contents of the above applications are all incorporated by reference as if fully set forth herein in their entirety.

TECHNICAL FIELD OF THE INVENTION

The invention relates to a system for processing or editing media content and to appropriate methods for tagging, storing and for the cutting and distribution of media data.

TECHNICAL BACKGROUND OF THE INVENTION

Media Asset Management (MAM) Systems

Systems referred to as media asset management (MAM) systems or digital asset management (DAM) systems permit efficient management of multi-media information (media contents) and thus allow to achieve economic benefits and competitive advantages.

A "media asset" typically describes a form of content which is provided for use in electronic systems in a structured, weakly structured and unstructured form. A "media asset" consists of multi-media unstructured information objects (such as audio and video) and of structured meta-information. By adding structured metadata, a media information object representing merely information becomes a "valued asset" which is available, researchable, reusable and can also be commercially traded. The structured metadata contain for example information about the author, copy rights, creation date and format information as well as content descriptions, technical and content-related classifications or ratings.

A MAM system manages random contents (media assets) about metadata and databases and controls access and use in connection with a digital rights management (DRM) and accounting system. MAM systems are designed for high scalability in order to store very large amounts of data and arranged for the conversion of contents in order to make the stored contents available in different formats for online use and for distribution.

The MAM system provides for the reception, storage, categorising, indexing and provision of media assets on the premise of permitting high editing speeds and optimal reuse. The basic set-up of a MAM system includes functions such as tagging and indexing, mechanisms for data security and access control, media-specific data management, complex search functions via metadata as well as automatic image content recognition, support of the workflow during media production, version management and administration as well as management of copyrights, digital signatures, watermarks and licenses.

Processing Media Data

There are several possibilities for processing image data. As shown in FIG. 1, conventional systems begin by creating a media file from the video signal in a high resolution (high resolution—HiRes) file format, such as ProRes 4:2:2 HD, DNX HD, etc. In cutting systems, when cutting a contribution/program a cutting list is created which is based on the high-resolution image material and sound material.

After the media file (HighRes file) has been created and stored in the storage facility, a process of rendering and transcoding begins in order to create a "low-resolution" file from this high-resolution format of the file, in particular in order to make the media file accessible via the internet, for example. In the jargon the result may also be called a low-resolution (LoRes) proxy file (LowRes file) which is used for reviewing and editing in the network. These low-resolution media files encode the media data for example with the aid of a H.264 code.

This transcoding process takes about ¼ to ⅙ of the time which the media data (e.g. the film or more generally a recording) in high-resolution needs for playback in real time. This process requires a lot of computing power since a transcoding process has to initially decode internally all data and then has to encode it using another low-resolution codec (e.g. transcoding from a XD CAM HDS codec into a H.264 codec). Normally the entire computing power of the computer which executes such a transcoding is used and blocked. The low-resolution media content is not available for viewing via e.g. the internet or in the network (e.g. LAN) until after it has been transcoded as LoRes files. Furthermore it also means that in case a certain material of the high-resolution media file is to be used at another location, the high-resolution media file must first be transmitted—by means of a satellite feed, for example—to the destination, involving correspondingly huge amounts of data to be moved.

SUMMARY OF THE INVENTION

It is an object of the invention to propose a system which permits access to the media data within seconds from the start of recording them, no matter where in the world they are located. In particular it is desirable that the system permits reviewing and further processing of the media data within seconds from starting to record them.

According to one aspect of the invention a high-resolution (HiRes) media stream is generated from the recorded media data present for example as a digital high-resolution video signal by means of a high-resolution codec, and at the same time a low-resolution (LoRes) media stream is generated from the same recorded media data by means of a low-resolution codec, both of which can then be accessed directly via the internet or a network. These media streams can also be regarded as a growing file because newly encoded media data are constantly added. The codec for the high-resolution media stream may, for example, be a file-based format for electronic reporting such as XD CAM HD, and the codec for the low-resolution media stream may, for example, be a H.264 codec, MPEG2 codec or a VC-1 codec.

A further aspect of the invention is the efficient "tagging" of the media data by adding metadata containing e.g. the content of the media data, location, date, time of recording, etc. The proposed system permits, by means of the metadata, to search for and locate media contents or to index the same. "Tagging" is based on the low-resolution media stream and this process can therefore also begin as soon as the first parts of the low-resolution media stream and/or of the high-resolution media stream are present. If "tagging" is based on the media stream with low resolution, only a small amount of data needs to be communicated to a corresponding work place (computer) for "tagging". By this means the amount of data to be transmitted can be significantly reduced because there is no need for the high-resolution media stream to be available for this operation. This also allows "tagging" to be carried out independently of the location, because the low-resolution media stream can be transmitted to any location (i.e. a computer connected to the internet or a network) including using very narrow bandwidths.

The "tagging" of the media data is carried out in a format which allows individual metadata to be allocated either to the media stream as a whole or to individual sequences or images therein. The format for the metadata is configured such that individual meta-information is allocated both to the corresponding sequences or images in the low-resolution media stream and in the high-resolution media stream, even if "tagging" is performed only by means of the low-resolution media stream and/or the high-resolution media stream. For example, as early as during generation of the two media streams, it is ensured that the respective images or sequences in both streams are given the same identification code, such as a time code. Correspondingly the metadata are linked with identification codes allowing them to be allocated to corresponding images or sequences.

Last but not least therefore it is possible, in an exemplary implementation, to perform a rough cut of the media data by way of the low-resolution and/or high-resolution media stream and optionally on the basis of the associated metadata on a computer. Even if the metadata are not mandatory for cutting, it is advantageous for an editor to define individual entry points into the media stream or sequences therein, not in an abstract manner by way of the identification codes, but to identify corresponding entry points into the media streams or sequences therein for cutting, with the aid of individual metadata. In an exemplary implementation the cutting computer and the computer for tagging may be one and the same computer (or in other words, the cutting software and the logging software for tagging may be installed on one computer or configured as one or more components of a software). It is also possible for the computer to act as a transcoding apparatus, i.e. to receive the preferably high-resolution media data and convert them into the media streams with high resolution and low resolution. Alternatively this may be carried out externally, e.g. by means of a so-called media stream box.

The use of identification codes synchronised between the low-resolution and the high-resolution media stream (and the fact that metadata can be allocated to both streams) makes it possible for a rough cut based on the low-resolution or high-resolution media stream or the cutting information to be applied also to the media data of the low-resolution or high-resolution media stream. Correspondingly the rough cut based on the low-resolution media stream permits a material selection from the high-resolution media stream and vice versa. Thus the high-resolution media data necessary for fine-cutting may be requested from the high-resolution media stream based on the rough-cut data (i.e. corresponding information describing the required images and image sequences in the high-resolution media stream for example by means of the identification codes). In contrast to a conventional system, only parts of the high-resolution media data may be requested and transmitted from their respective storage location, thereby possibly obviating the need for a satellite link. This can, for example, be advantageous for news and quick live reporting, where media data of good quality must be transmitted quickly and above all in a reviewed state, to the respective place of broadcasting.

Metadata for all media data processed by the system are stored in a database and linked with the corresponding low-resolution or high-resolution media streams. The low-resolution and high-resolution media streams also can be stored in databases for access at a later date. Linking the metadata and the low-resolution and high-resolution media streams may be effected, for example, via corresponding identifiers (IDs) associated with the metadata and the media stream in the databases. Alternatively the low-resolution and high-resolution media streams and the metadata themselves may comprise additional information which permits linking the media stream with the metadata and optionally also among each other.

As a result it is possible, using the metadata, to search for certain contents/information in the various recorded media data, to determine the corresponding low-resolution media streams in the different databases/storage locations, which match the search criteria, and to then request these for a precutting as already described. As such it is possible to create a precutting of a media contribution, which is based on several different media data without having to transmit all the high-resolution media data required for the cutting of the entire media contribution over a network.

One embodiment of the invention relates to a media system which comprises a transcoding apparatus which preferably receives high-resolution media data and converts these into a media stream with low resolution and a media stream with high resolution and provides them with an identical media stream identifier, wherein individual images of the media data in both media streams are provided with identical identification codes by the transcoding apparatus. The media system further comprises a logging apparatus which receives the media stream with low resolution (and optionally also the media stream with high resolution) and displays the media data therefrom to a user, wherein the logging apparatus is further arranged to provide the media data as a whole, individual image sequences or images therefrom with metadata. The individual metadata are allocated, with the aid of the identification codes, to individual image sequences or images of the media stream with low resolution or the media stream with high resolution and combined with the media data by means of the media stream identifier.

In a further embodiment the media system further comprises a first cutting apparatus which receives the media stream with low resolution and the associated metadata and enables the user to create a cut list for cutting the media data of the media stream with now resolution using the metadata.

The media system may further comprise a second cutting apparatus which, with the aid of the cutting list for cutting the media data, obtains the parts of the media stream with high resolution necessary for cutting the media data via a network and enables a user to cut the media data based on the obtained parts of the media stream with high resolution.

In an exemplary embodiment the first cutting apparatus inserts into the cutting list the media stream identifier of the media stream with low resolution in order to enable the second cutting apparatus to receive the corresponding media stream with high resolution. Further the cutting list generated by the first cutting apparatus can identify the parts of the media stream with the aid of identification codes of the images.

According to a further embodiment of the invention the first cutting apparatus allows cutting based on slogans and identifications in the metadata and is capable of translating these into identification codes of the images for generating the cutting list, in order to identify parts of the media stream.

The media stream with low resolution may preferably comprise a low bitrate, preferably in the range of 0.5 Mbit/s to 2 Mbit/s. The media stream with high resolution may comprise a high bitrate, preferably 50 Mbit/s or higher.

The media system according to a further embodiment of the invention may further comprise one or more metadata databases, which receive the metadata via a network and store them, and/or receive and store one or media databases, which are sent by the two media streams generated by the transcoding apparatus over a network.

The invention relates further to a method for editing media data. According to the method a transcoding apparatus receives preferably high-resolution media data and converts these into a media stream with low resolution and a media stream with high resolution. Further the transcoding apparatus provides the two media streams with an identical media stream identifier. The method further comprises adding an identical identification code into the individual images of the media data corresponding to one another into the two media streams by the transcoding apparatus.

The media stream with low resolution, optionally also the media stream with high resolution and its/their media data, are further received in a logging apparatus which displays the media data to a user. Further, according to the method metadata are added to the media stream as a whole, to individual image sequences or to images therefrom by the logging apparatus, wherein the individual metadata, with the aid of the identification code, are allocated to individual image sequences or images of the received media stream or streams and are combined with the media data with the aid of the media stream identifier.

In a further embodiment the method further comprises receiving the media stream with low resolution and the associated metadata in a first cutting apparatus and creating a cutting list for the cutting of the media data of the media stream with low resolution using the metadata by the first cutting apparatus.

In a further embodiment the method further comprises receiving the parts of the transcoding apparatus necessary for cutting the media data, via a network by a second cutting apparatus using the cutting list. The second cutting apparatus enables a user to cut the media data based on the received parts of the media stream with high resolution.

In a further embodiment the method further comprises coupling several stream boxes in a network together so that simultaneous joint "tagging" can be effected for several media data sources for the respective high-resolution or low-resolution media streams. The individual media streams from the different media data sources can be combined in so-called projects and provided with the same media stream identifier. Correspondingly it is possible to simultaneously effect corresponding "tagging" for individual media sources or simultaneously for several of the media sources.

For "tagging" the logging software can be adapted accordingly (e.g. single-mode and multi-mode) in order to permit editing of the individual media data sources or of a group of several media data sources. Thus it is possible, for example, to realise a pre-selection ("live"—precutting) of the desired image material and sound material based on the low-resolution media streams of several media data sources and to make these available as a cutting list.

In a further embodiment the method further comprises administration of all necessary components of the media system and gives the user control of the media system via an interface. Administration encompasses, among others, administration of direct and indirect memory accesses, a version management for controlling the different states of the media data, a check-in/check-out system for the controlled provision of media data and metadata, the rights management (DRM) for image rights and administrative rights, the processing of purchases and sales, time and hour management as well as long-term archiving.

Similarly in a further embodiment it encompasses distribution of the media contents created by means of the media system. The media streams generated or any contributions/programs edited therefrom in high or low resolution may for example be transmitted to mobile devices such as mobile phones, smartphones and tablet PCs, apps of all operating systems, playout on tapes, data carriers such as CDs, DVDs or blue-ray via FTP, Internet, extranet, intranet and e-business-portals. Digital television, multimedia services such as livestream, IP-TV and the supply of social networks (Facebook, twitter, YouTube . . . ) cover all possibilities.

A further aspect of the invention relates to the implementation of individual functions of the media system in software. Accordingly the invention also relates to computer-readable media which store commands which, when executed by a processor of a computer, cause the computer to realise the corresponding functions. For example, in one embodiment commands of a software are stored on a computer-readable medium, which commands when executed by the computer, enable the user to provide media streams with slogans and commentaries (tagging). A further embodiment relates to a software which enables the user to find media contents in media databases, metadata-bases etc. of the media system, and to cut a program or a contribution from the selected media contents. Further a further embodiment relates to a software which provides an interface to the media databases, metadata-bases etc. of the media system and which processes the search queries and requests for media contents accordingly.

DESCRIPTION OF THE FIGURES

The invention will now be described in detail with reference to exemplary embodiments shown in the figures. Elements and details in the figures corresponding to each other are marked with the same reference symbols.

FIG. 3 shows a media system according to an embodiment of the invention.

DETAILED DESCRIPTION OF THE INVENTION

Figure 1:
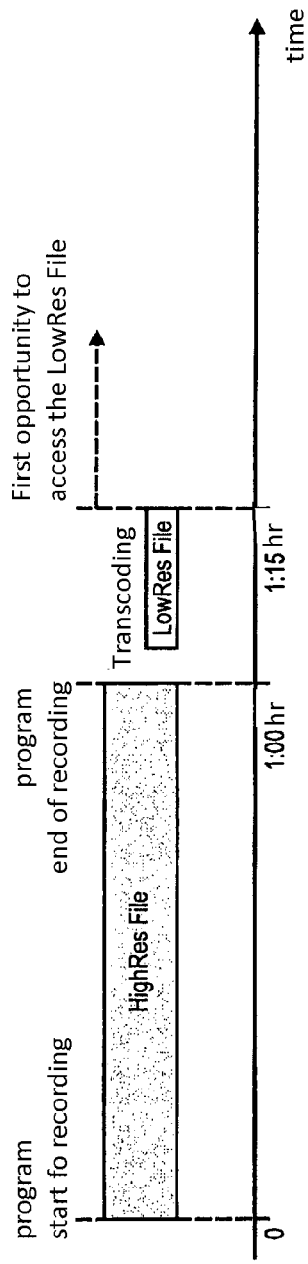
FIG. 1 shows a conventional media system in which a program is initially stored as a high-resolution media file, which is then transcoded into a low-resolution media file.
Figure 2:
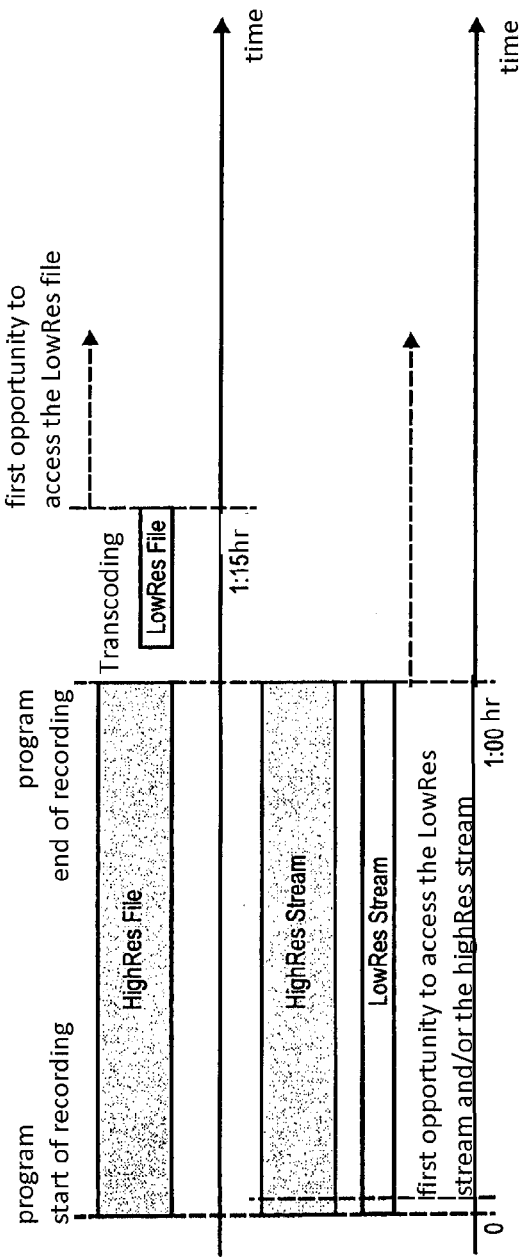
FIG. 2 shows a comparison over time between the system of FIG. 1 and a media system according to the invention which works with media streams.

FIG. 3 shows the media system according to an embodiment of the invention. As already mentioned it is an aspect of the invention to generate, from the recorded media data present for example as a digital high-resolution video signal, a high-resolution media stream (HiRes stream) by means of a high-resolution codec and, at the same time, to generate from the same recorded media data a low-resolution media stream (LoRes stream) by means of a low-resolution codec, which streams can then be accessed via the internet or a network, as illustrated in FIG. 2. Thus it is possible, after a short time of the source material being available, to transmit a low-resolution media stream in the Internet via narrow-band networks.

In FIG. 3 the source material is provided to a media stream box which can be realised using, for example, a computer system specially designed for the transcoding of media data. The media stream box simultaneously transcodes the recorded media data into the high-resolution media stream (HiRes stream) and the low-resolution media stream (LoRes stream). The images corresponding to each other in the media streams are provided by the media stream box with the same identification codes, e.g. identical time codes, so that identical images in the two media streams can be identified by an identifier. The media stream box is also connected to a network via which the high-resolution media stream (HiRes stream) and the low-resolution media stream (LoRes stream) can be transmitted to a media database and optionally to one or more media-logging computers. Further the media stream box provides the two media streams with an unique media stream identifier (e.g. a generated unique identifier—UID), by means of which media streams of the same content belonging to each other can be found in the media database.

In order to reduce the amount of data to be transmitted via the Internet, it is advantageous if the media database that is to store the at least high-resolution media stream is located within the (wired or optical) network, in which the media stream box is also located. The low-resolution media stream can be shared in the same or in another media database/storage location.

In one embodiment the media stream box is implemented as a PC system which is operated with a bootable operating system (hard disc, chip or network). The PC system may be equipped with a graphic card, monitor, mouse and keyboard. Additionally a special graphic card is installed which permits the processing of SD and HD SDI video signals. The software required for transcoding and configuration is also installed on a data carrier and may be optionally protected against copying by a dongle. This software is used to transcode the fed-in source material into several files, either locally or via the network. The media stream box may further encompass established interfaces such as USB, firewire etc. and be connected to the network/the Internet. Moreover it is possible to operate as many stream boxes as liked in parallel in the network. All stream boxes in the network are kept synchronised by means of a software so that the identification codes which are variable over time (e.g. time stamp) are uniformly "clocked" among each other.

The media data may, for example, be encoded using a SD or HD SDI codec and come from an outside broadcast van, a (HD) camera, a satellite feed, an optical storage medium (e.g. Professional Disc, Blu-Ray disc, etc.), a tape, etc. It is advantageous but not mandatory that the recorded media data are present as source material for processing in a high-resolution format with a bit rate of approx. 50 Mbit/s or higher. The image resolution of the source material may be 720p, 1080i or even higher. But again this is not mandatory.

The codec for the high-resolution media stream may for example be in a streaming-capable format such as XD CAM HD, the codec for the low-resolution media stream may e.g. be a H.264 codec, MPEG2 codec or VC-1 codec.

The data rate of the high-resolution media stream may e.g. be in the range of approx. 50 Mbit/s and higher, but lower data rates in the two-digit Mbit/s range are also possible. Advantageously the image resolution of the high-resolution media stream should be 720p, 1080i or 1080p or higher. But a lower resolution is also possible.

The low-resolution media stream should comprise a data rate such that it can be transmitted without problems via networks with narrow bandwidths (e.g. mobile networks) and should be in the range of 1-2 Mbit/s, for example. In one embodiment of the invention the image resolution of the low-resolution media stream corresponds to that of the high-resolution media stream. Optionally it is possible that the low-resolution media stream is made available to the public directly via the Internet, e.g. via YouTube or similar portals.

A further aspect of the invention is the efficient "tagging" of the media data by adding metadata which for example include the content of the media data, location, date, time of recording, etc. The proposed system makes it possible, by means of the metadata, to search for and find or index media contents. The "tagging" may be based on the low-resolution media stream. But it is possible that the high-resolution media stream is also present and thus both media streams can be provided with metadata. This process may begin as soon as the first parts of the low-resolution media stream are present.

The "tagging" based on the low-resolution media stream may be particularly advantageous because only a small amount of data needs to be transmitted to a workplace (computer) for "tagging" so that the amount of data to be transmitted can be significantly reduced. Since the high-resolution media stream does not need to be available for this operation, "tagging" may be effected independently of the location because the low-resolution media stream, even using very narrow bandwidths, can be transmitted to any location (i.e. any computer connected to the Internet or a network).

In the embodiment of FIG. 3 tagging is effected by means of a media-logging computer which permits editorial recognition, registration, and evaluation of image sequences in live operation via a corresponding user interface. Optionally tagging and transcoding can be implemented on one computer. The low-resolution media stream and possibly also the high-resolution media stream is visually displayed to the user on a media-logging computer. In an exemplary embodiment the user can choose between displaying the low-resolution media stream or the high-resolution media stream by means of the user interface and/or change over between them. It is also possible for the user interface to allow the user to move in the respectively shown media stream by means of a shuttle function.

Displaying and/or tagging may be effected either in parallel with the continuous generation of the low-resolution media stream (so-to-speak "live") or alternatively the user may select a media content for tagging, whereupon the associated low-resolution media stream and/or high-resolution media stream is requested from the corresponding media database/storage location via the network and transmitted (e.g. streamed) to the media-logging computer. During the tagging process the image material and sound material currently being processed is enriched with metadata in that, for example, its content is visually analysed by the user and indexed/tagged according to editorially specified criteria.

Tagging of the media data is effected in a format which allows to allocate individual metadata either to the media stream as a whole or to individual sequences or images therein. For example, all metadata for a media stream are linked to its media stream identifiers in order to be able to allocate the metadata to the corresponding media data in the media database(s). The format for the metadata is laid out such that the individual meta-information contains information which is allocated to both the corresponding sequences or images in the low-resolution media stream and the high-resolution media stream, even although tagging is only effected by means of the low-resolution media stream or high-resolution media stream.

For example, it is already ensured upon generation of the two media streams that the respective images or sequences in both streams are provided with an identical identification code, such as a time code. Correspondingly the metadata are linked to identification codes so that they can be associated to corresponding images or sequences. For example, in order to identify and associate the individual metadata to individual images or image sequences within the media stream, the corresponding metadata can comprise an identification code (e.g. time code) of the corresponding image or information about the identification codes for first and last image of a sequence. A time code may for example be in the format hh:mm:ss:ff, wherein hh indicates the hour, mm the minutes, ss the seconds and ff the number of individual images relative to the beginning of the media stream.

A sequence of images may for example be indicated in the metadata with the aid of the identification code of the first and last image in the sequence or by identification of the first image of the sequence and the length of the sequence (e.g. as the number of images, time duration in milliseconds, or seconds, a combination of the before-mentioned parameters, etc.).

It is also possible to couple the logging computer to a system for recording measured data, which system gathers measured data provided with an identification code (e.g. time code). The data may, for example, be determined periodically. As such it is possible, in the metadata, to automatically allocate measured values to individual images or image sequences in the media data by means of the identification code and store them together with other values in the metadata database. For example, in the case of motorcar races the racing teams already record (periodically, partially in second cycles or operation-dependent) vehicle-related measured data provided with a time code such as position (e.g. GPS data), gear, accelerator position, brake pedal position, steering wheel angle etc. These measured data can be fed into the logging computer and/or the metadata database and stored as part of the metadata, linked with the corresponding images of the media data by means of the time code.

The created metadata thus contain information known about the content of the processed media data, but not directly readable from its content such as file name, date created and amended, size, media stream identifier, measured data etc. As such metadata may contain details about the subject and content of the media data which, as researchable key terms, enable the content-based classification and retrieval of the material. Features of metadata creation are, among others:

providing an arbitrary number of metadata categories and keywords for a media stream
 several levels for categories and keywords
 multi-lingual administration of keywords and categories
 multi-lingual tagging and image descriptions
 no limitations in the number of possible languages
 authorising systems for safeguarding access and for the protection of information
 etc.

The metadata are stored in a metadata database which for example may be implemented as a XML database. The metadata database is connected with the media-logging computer via a network so that the media-logging computer, following tagging, can store the metadata in a metadata database. Further the metadata in the metadata database can be accessed via the network. The metadata can be stored hierarchically in a XML database. A multitude of applications is thus possible because the meta-information about the media data can be exchanged independently of platform between different systems. XML offers the possibility to break the media contents down to the smallest content components and to deposit its logical context by means of a tree structure and provide it with meta-information if required.

The structure of the XML files is defined by a XML scheme which is stored in a directory. For communication with several different directory services, XML or the DSML (directory service markup language) derived therefrom is used for the neutral description of the stored data, which means that it is possible to work relatively independently of existing data models. Consolidating thereof can be described using other portals. In these portals user-specific information is prepared by way of the organisational structure and further sorting criteria.

The media system offers the possibility of conducting a data exchange with almost any storage system or of assuming the logging and distribution activities for such a system. Data is created, stored and may be synchronised with other stores. The media data remain unchanged because they were already recorded in the correct codec, and the metadata can be allocated without problems by means of the media stream identifier.

Further the metadata for one or more media streams can be stored in so-called log files in the one or more metadata databases. Individual log files can be allocated to individual media streams, several media streams or an entire project by the user by means of a logging apparatus and can be optionally edited/modified.

FIG. 3 shows the media-logging computer as a single computer system. It goes without saying that an arbitrary number of media-logging computers can be provided which need not all be installed at the same location (i.e. in the same wired or optical network). The media-logging computers can therefore be made available independently of the storage location of the high-resolution media streams because for tagging they only need the low-resolution media streams. Similarly it is also possible for the media-logging computers to be connected via wireless networks, such as a mobile network, WLAN or WiMAX network, i.e. location-independent. For example, the media-logging computers can also be realised as apps on smartphones, table PCs, conventional home computers etc.

For example, a client software for tagging and/or for cutting based on low-resolution image material can be realised in a standard browser (e.g. Internet Explorer, Mozilla, Google Chrome, Apple Safari etc.). This may comprise for example an access software for login into an access control system (see information management service/DML service of the media access server). Login may be via a LAN, intranet, Internet etc. The registration data may be client-specific.

As already mentioned the high-resolution media streams and the low-resolution media streams can be stored in one or more media databases. The media database(s) are connected to a network so that they can be accessed via a computer. The media database(s) may be implemented as a storage system based on NAS (network attached storage), SAN (storage area network) or SAS (serial attached SCSI) techniques.

Access to the media database(s) (not shown in FIG. 3) and/or the metadata database(s) may be effected via one or more media access servers (not shown in FIG. 3). In an exemplary embodiment an information management service (e.g. DML service) is used for this in order to realise and control access to all information in the databases. To this end the DMLS (Digital Media Library Service) may be realised as a software which from the outside looks like a standard file system (UFS or NFS) and is thus completely transparent.

The DML service is responsible for reception and storage of the metadata created on the logging computers and of the high-resolution media streams and low-resolution media streams. It manages the storage locations in the dynamic storage system, in the memory as such and in the long-term archive. The storage location of the high-resolution media streams and low-resolution media streams (and their metadata) is determined by the properties and the class membership (in the metadata) of the information to be stored. Further the DML service controls access to the information in the databases. For example the DML service enables search queries to be executed in the metadata and as such can retrieve and provide media data/contents.

All media data processed by the system may be stored in a database and are linked to the corresponding low-resolution and high-resolution media stream. The low-resolution and high-resolution media streams are stored, as described, in corresponding databases/storage locations in order to be able to access them later via e.g. a media access server. In this way it also becomes possible, using the metadata, to search in different recorded media data for certain contents/information, to determine the corresponding low-resolution media streams in the databases/storage locations corresponding to the search criteria and to then request these for a "precutting". As such a precutting of a media contribution based on several different media data can be generated without the high-resolution media data being necessary for cutting the total media contribution having to be transmitted as a whole via a network.

FIG. 3 in this context shows a precutting computer which permits reviewing the existing media material and cutting a contribution/program. The precutting computer executes a cutting software which a. o. allows the user to search the databases for contents. As already described, access (and the search for contents) may be realised via the media access server (or its information management service such as a DML service). The cutting software allows the user to formulate search queries. The search terms entered are then searched for by the media access server in the metadata stored in the metadata databases, and any hits are transmitted back to the precutting computer via a network.

Here they are displayed in order to enable the user to make further suitable content selections for the desired program (contribution) to be cut. Dependent on user input the precutting computer requests one or more low-resolution media streams and optionally further associated metadata via the media access server from the database(s) and displays the one or more low-resolution or high-resolution media streams to the user by means of the cutting software. The media streams are identified by means of their media stream identifiers contained in the associated metadata of the hit list.

Based on the low-resolution and/or high-resolution material and the associated metadata the user can now prepare a precutting list which identifies the contents required for the program (contribution) to be cut. Cutting may include using the metadata which is translated by the precutting computer into the desired media streams and the corresponding images or image sequences thereof and identified information in the cutting list.

By using the cutting software with which the audio and video material can be searched, taken in and processed via the network, and by making an input into a search mask, the user can for example cause the precutting computer to find all media streams, in which accidents or overtaking manoeuvres of a certain Formula I driver occur. The metadata obtained in this way identify the individual media streams by means of the media stream identifier and also indicate the entry point (or the corresponding image sequence) into the individual media streams by means of the identification codes in the metadata. This enables the user to quickly search for desired contents and to selectively include them in a cutting list directly or following further reviewing. The cutting list then identifies the desired sequences or images of the median streams by means of the media stream identifier and identification codes.

The completed cutting list of the cut can be optionally stored in a database in order to access it by means of another cutting system (e.g. for fine-cutting). The cutting list can be retrieved by again providing it with corresponding metadata.

Using the cutting list a further "fine-cut" can then be effected, based on the high-resolution material. In FIG. 3 the fine-cut, as an example, is carried out on a further fine-cut computer. But it is also possible to perform the pre-cut and fine-cut on one computer (with a cut software). In this case it would also be possible, using the metadata in the first hit list, to immediately request parts of the low-resolution or high-resolution media streams from the databases/storage locations for further cutting. However it probably is preferable, as a rule, to conduct a further review and more accurate selection of material by way of the low-resolution material, in particular if the cutting computer is not connected with the network/Internet via a broadband connection.

The fine-cut computer receives the cutting list either from a precutting computer or from a database and requests, depending on the hits content, the parts of the high-resolution media stream or streams required for the cut via the network from the one or more media databases/storage locations. This access can again be effected via the media access server. Based on the high-resolution image and the sound material the user can now cut the desired program (contribution) and optionally provide it with the corresponding metadata. The cut program (contribution) can then be broadcast in the conventional manner or stored in a media database/storage location etc. In one embodiment of the invention the fine-cut is performed simultaneously on the low-resolution and the high-resolution media streams, so that a cut program (contribution) is available both in low-resolution quality (for example for distribution via the Internet) and in high-resolution quality (for example for distribution via digital radio, recording on storage media etc.).

A cutting computer (for precutting and/or fine-cut) can be implemented, like the media-logging computer, in the most varied form. In one embodiment the media-logging computer and the cutting computer are implemented as one computer. Again, any number of cutting computers can be provided which need not be necessarily installed in the same place (i.e. in the same wired or optical network). The precutting computers can thus be made available independently from the storage location of the high-resolution media streams because they only need the low-resolution media streams for the cut, and only selected parts of the high-resolution material have to be retrieved from the databases for the fine-cut, provided this is carried out on the same computer. Correspondingly it is also possible for the cutting computers to be connected via wireless networks such as a mobile network, WLAN or WiMAX. The cutting computers for example may also be realised as apps on smartphones, tablet PCs, conventional home computers etc.

The described media system thus allows the different media contents to be provided in different ways to target groups in a controlled use-oriented manner. This may include active components such as dispatch by email, data carriers or circulars as well as passive publication on websites and portals, where the target group helps itself to the information.

The cut programs and contributions, as already mentioned, can again themselves be stored in one or more media databases where they can be available in a high-resolution and a low resolution media file. The cut programs and contributions can then be accessed via a media portal comparable to an exhibition space. This exhibition space may be realised as an additional software component with which the high-resolution or low-resolution material of a program or contribution is transcoded using the desired codec. It is thus possible, for example, to offer a program or contribution produced by means of the media system in the most varied formats and adapt it to the respective distribution platform (e.g. Facebook, YouTube, DVD, . . . ).

As already mentioned the media system may also encompass a plurality of media stream boxes. In a further embodiment of the invention these media stream boxes are synchronised in the network and generate, from the respective incoming high-resolution media data, several synchronously held (as regards their identification codes, e.g. time codes) media streams (respectively in high and low resolution).

Further it is possible to combine the incoming media data from various sources to form a common project (e.g. different camera settings at a live event). To this end the media stream boxes may provide the high-resolution and low resolution media streams of a project all with the same project identifier (project ID). By means of the logging software the media streams of the project (or the low-resolution and high-resolution media stream pairs) can be provided individually, in groups or all together with metadata. Similarly it is possible to add to these projects, or import into them, media data from other sources (e.g. hand-held cameras, helicopter pictures, slow motions, photos, etc.), possibly subsequently or while recording is going on. It is advantageous if these added media data also comprise identification codes synchronised with the other media data of the project because this makes it possible to link already existing metadata to the added media data.

The cutting system of the media system (e.g. the precutting computer and/or the fine-cut computer, or a combined device with which a program/contribution can be cut) can, as in the previously described embodiments, search and query, by means of the metadata, contents, slogans, etc. in the media database(s)/storage location(s). If all media streams of the project are provided with the same metadata, a search query will supply hits in the metadata of all media streams of the project.

In this way all low-resolution (and depending on implementation of the cutting system all high-resolution) media streams of the project can be made available.

Insofar as only individual media streams or a group of media streams in a project are provided with metadata, the cutting software can still identify all media streams belonging to the project by means of the project identifier and retrieve them from the media database(s)/storage location(s) if required. In one embodiment the user can specify in a graphic user interface of the cutting software, whether he wishes to receive as hits for his search query, not only the media streams, the metadata of which contain search hits but also the additional media streams of the project. Optionally, when requesting a media stream as a hit, the user may also specify in the search, whether or not the associated media streams of the project are requested as well. The project identifier is therefore specified in this request allowing for example the media access server to load the corresponding media streams from the media database(s)/storage location(s).

It is also possible for the cutting software to display the individual media streams of a project in "multi-mode", where the individual media streams of a project are displayed to the user on a screen, synchronised over time. By means of such a split-screen display (i.e. several windows are displayed on a screen, containing the respectively streamed image contents and identical time codes) of the operation, the respective media streams of the project can be visualised in a simple way, whilst with the "single-mode" only one media stream is visualised on the screen.

The media system also allows third parties to access finished programs and contributions or to search the media databases and metadata databases and display the contents. Since the media data are available also in the form of tagged low-resolution media streams, the contents in the media system can be accessed without a broadband connection via the network. Access to the media contents is controlled by the media access server.

What is claimed is:

1. A media system comprising:
   a transcoding apparatus which preferably receives high-resolution media data and converts these into a media stream with low resolution and a media stream with high resolution and provides them with an identical media stream identifier, wherein the individual images of the media data in both media streams corresponding to each other are provided with identical identification codes by the transcoding apparatus, such that respective images corresponding to each other in both media streams are provided with the same identification code,
   a logging apparatus which receives the media stream with low resolution and displays the media data thereof to a user, wherein the logging apparatus is further configured to provide either the media data as a whole, individual image sequences or images therefrom with metadata,
   wherein the individual metadata are associated to individual image sequences or images of the media stream with low resolution using the identification codes and are linked with the media data using the media stream identifier,
   wherein the logging apparatus is adapted to access the media stream with low resolution and to provide it with metadata.

2. The media system according to claim 1, further comprising:
   a first cutting apparatus which receives the media stream with low resolution and the associated metadata and enables a user to create a cutting list for cutting the media data of the media stream with low resolution using the metadata.

3. The media system according to claim 2, further comprising:
   a second cutting apparatus which receives the necessary parts of the media stream with high resolution via a network using the cutting list for cutting the media data and enables a user to cut the media data based on the received parts of the media stream with high resolution.

4. The media system according to claim 2, wherein the first cutting apparatus inserts the media stream identifier of the media stream with low resolution into the cutting list in order to enable the second cutting apparatus to receive the corresponding media stream with high resolution.

5. The media system according to claim 2, wherein the first cutting list generated by the first cutting apparatus identifies the parts of the media stream with the aid of identification codes of the images.

6. The media system according to claim 2, wherein the first cutting apparatus permits cutting based on slogans and identifications in the metadata and translates these for the generation of the cutting list into identification codes in order to identify parts of the media stream.

7. The media system according to claim 1, wherein the media stream with low resolution comprises a low bitrate, preferably in the range from 0.5 Mbit/s to 2 Mbit/s.

8. The media system according to claim 1, wherein the media stream with high resolution comprises a high bitrate, preferably 50 Mbit/s or higher.

9. The media system according to claim 1, further comprising one or more metadata databases which receive the metadata via a network and store them, and/or one or more media databases which receive the two media streams generated by the transcoding apparatus via a network and store them.

10. The media system according to claim 1, wherein the logging apparatus is further adapted to receive measured data from a measured data system, which data are stored as metadata of the media data in one or more metadata databases, wherein the measured data comprise identification codes, with the aid of which they can be allocated to the images of the media data.

11. The media system according to claim 1, wherein the logging apparatus is adapted to also receive the media stream with high resolution and display the media data therefrom to a user,
wherein the individual metadata are allocated to individual image sequences or images of the media stream with high resolution with the aid of identification codes, and
wherein the logging apparatus is adapted, as soon as the first parts of the media stream with high resolution are present, to access the same and to provide them with metadata.

12. A method comprising:
receiving preferably high-resolution media data in a transcoding apparatus,
converting the media data into one or more media streams with low resolution and one or more media streams with high resolution using the transcoding apparatus,
providing the two media streams with an identical media stream identifier using the transcoding apparatus,
adding an identical identification code to the individual corresponding images of the media data of the two media streams using the transcoding apparatus, such that respective images corresponding to each other in both media streams are provided with the same identification code,
receiving the media stream with low resolution and its media data in a logging apparatus,
displaying the media data of the media stream with low resolution using the logging apparatus, and
adding metadata to the media data either as a whole, to individual image sequences or images therefrom using the logging apparatus, wherein the individual metadata are associated, to individual image sequences or images of the media stream with low resolution with the aid of identification codes, and are linked with the media data with the aid of the media stream identifier.

13. The media system according to claim 1, wherein the transcoding apparatus is adapted to receive streams of media data of a project from different sources, to convert the respective streams of media data into a media stream with low resolution and a media stream with high resolution, and assigns a project identifier to the media streams with high and low resolution,
wherein the transcoding apparatus provides respective individual images of the low resolution and high resolutions streams of all or a part of the streams of media data that are corresponding to each other are provided with identical identification codes by the transcoding apparatus to associate the meta data with said part of or all the low resolution and high resolutions streams belonging to the project.

14. The media system of claim 13, wherein the transcoding apparatus provides an identical media stream identifier for the high resolution stream and the low resolution steam of a respective one of the streams of media data received by the transcoding apparatus.

15. The media system according to claim 1, the media system enables a search for individual image sequences or images within the high resolution and low resolution media streams using the meta data, wherein said individual image sequences or images are identifiable using the meta data.

* * * * *